(12) United States Patent
Goldschmidt et al.

(10) Patent No.: US 7,918,756 B2
(45) Date of Patent: Apr. 5, 2011

(54) HYBRID TRANSMISSION

(75) Inventors: Stefan Goldschmidt, Waiblingen (DE); Anna Krolo, Stuttgart (DE); Reiner Paetzold, Stuttgart (DE); Jan-Peter Ziegele, Stuttgart (DE)

(73) Assignee: Daimler AG, Stuttgart (DE)

( * ) Notice: Subject to any disclaimer, the term of this patent is extended or adjusted under 35 U.S.C. 154(b) by 651 days.

(21) Appl. No.: 12/005,840

(22) Filed: Dec. 27, 2007

(65) Prior Publication Data
US 2008/0227577 A1 Sep. 18, 2008

Related U.S. Application Data

(63) Continuation-in-part of application No. PCT/EP2006/006115, filed on Jun. 24, 2006.

(30) Foreign Application Priority Data

Jun. 30, 2005 (DE) .................. 10 2005 030 420

(51) Int. Cl.
*F16H 3/72* (2006.01)
(52) U.S. Cl. .......................... 475/5; 475/151
(58) Field of Classification Search ............... 475/5, 151
See application file for complete search history.

(56) References Cited

U.S. PATENT DOCUMENTS

| | | | |
|---|---|---|---|
| 5,904,631 A | 5/1999 | Morisawa et al. | |
| 5,931,757 A | 8/1999 | Schmidt | |
| 6,022,287 A | 2/2000 | Klemen et al. | |
| 6,090,005 A | 7/2000 | Schmidt et al. | |
| 6,358,173 B1 | 3/2002 | Klemen et al. | |
| 6,478,705 B1 | 11/2002 | Holmes et al. | |
| 6,551,208 B1 | 4/2003 | Holmes et al. | |
| 6,743,135 B2 | 6/2004 | Klemen et al. | |
| 2003/0186769 A1 | 10/2003 | Ai et al. | |
| 2005/0037883 A1* | 2/2005 | Motoike et al. | 475/5 |
| 2006/0148605 A1* | 7/2006 | Raghavan et al. | 475/5 |
| 2006/0276288 A1* | 12/2006 | Iwanaka et al. | 475/5 |

FOREIGN PATENT DOCUMENTS

| | | |
|---|---|---|
| DE | 100 43 510 | 3/2002 |
| DE | 101 16 989 | 10/2002 |
| EP | 1 396 369 | 3/2004 |
| EP | 0 967 102 | 11/2004 |
| JP | 01 058990 | 3/1989 |
| JP | 2004 150267 | 5/2004 |
| JP | 2005127485 | 5/2005 |
| JP | 2005132143 A | 5/2005 |

* cited by examiner

*Primary Examiner* — Sherry Estremsky
(74) *Attorney, Agent, or Firm* — Klaus J. Bach

(57) ABSTRACT

In a hybrid transmission for a hybrid motor vehicle, with split power driving ranges, discrete gear steps and two electric drive motors (33, 34), a transmission arrangement is provided which results in low rotational speeds of the transmission elements, in particular of the planets while at the same time, the electric drive motors (33, 34) are disposed adjacent to one another at the input end of the transmission next to an internal combustion engine to which the transmission is connected.

8 Claims, 1 Drawing Sheet

HYBRID TRANSMISSION

This is a Continuation-In-Part application of pending International Patent Application PCT/EP2006/006115 filed Jun. 24, 2006 and claiming the priority of German Patent Application 10 2005 030 420.6 filed Jun. 30, 2005.

BACKGROUND OF THE INVENTION

The invention relates to a hybrid transmission with at least two split power ranges and two electric drive motors for a hybrid motor vehicle and furthermore to a hybrid motor vehicle having a hybrid transmission of this type.

Hybrid transmissions for motor vehicles, which have a plurality of split power drive ranges, discrete gear steps and, in addition to an internal combustion engine, two electric drive motors, are known, for example, from the publications U.S. Pat. Nos. 5,904,631, 6,478,705 B1, 6,358,173 B1, 6,090,005, 6,743,135 B2, 6,551,208 B1, EP 0 967 102 B1, U.S. Pat. Nos. 5,931,757, 6,022,287 and applicant's patent application DE 102004053044.

Hybrid transmissions of this type make it possible to operate the motor vehicle in an advantageous way, in particular, providing for example for a starting function by means of a geared-neutral driving range,
high starting torques,
operation of the internal combustion engine with a uniform rotational speed for different driving speeds,
a recovery of energy, for example in overrun, by means of the electric drive assemblies,
boosting operation,
a reduction in fuel consumption,
reduced exhaust gas emissions,
improved start/stop operation,
the absence of a need for a separate starter and/or a starting element,
a change in a stepless driving range from forward drive to reverse drive.

It is the object of the present invention to provide a hybrid transmission which is improved in terms of the construction space requirements and/or kinetic and kinematic conditions and also to provide a motor vehicle having a hybrid transmission of this type.

SUMMARY OF THE INVENTION

In a hybrid transmission for a hybrid motor vehicle, with split power driving ranges, discrete gear steps and two electric drive motors (33, 34), a transmission arrangement is provided which results in low rotational speeds of the transmission elements, in particular of the planets while at the same time, the electric drive motors (33, 34) are disposed adjacent to one another at the input end of the trans-mission next to an internal combustion engine to which the transmission is connected.

The transmission includes three differentials which are disposed in the force flux between the transmission's input shaft and the transmission output shaft and make it possible to have a multiplicity of different drive states. Since the electric drive motors are arranged axially adjacent to one another and between the three differentials and the internal combustion engine, the electric drive motors can have a relatively large diameter. And since the drive torque generated by means of the electric drive motors is dependent on the diameter of a rotor of the electric drive assembly, that drive torque is relatively high. On the other hand, for generating a predetermined torque, with the large diameter of the electric drive motors only relatively a small axial extent is needed for the electric motors. If, on the other hand, the electric drive motors with their large diameters would be arranged relatively far from the engine in the direction of the output, the hybrid transmission housing, spaced apart from the internal combustion engine, would require a large installation space, which is disadvantageous particularly in the region of a vehicle body tunnel and/or in the region of a passenger compartment.

Instead, in accordance with the invention, use is made of the fact that the input end of the hybrid gearbox is generally flanged to an internal combustion engine, the internal combustion engine which has a relatively large cross-section. Consequently, at a transition from the internal combustion engine to the two electric drive assemblies, the drive train cross-section does not need to be increased, but may even decrease. This is followed, sometimes with a further tapering of the transmission housing structure including the differentials, so that, with an increasing distance from the internal combustion engine, the drive train can be tapered even further. The cross-sectional configuration of as far as possible conventional tapering vehicle can therefore remain as the hybrid transmission is adapted to that shape.

Furthermore, the inventors of the present invention have recognized that, in the prior art hybrid transmissions, the rotational speeds of the planets are very high, at least in partial operating ranges. This results, for example, in undesirable heating,
increased wear,
increased bearing stresses and/or
increased noise generation.

In the transmission presented herein, the rotational speeds of the planets are reduced in that three differentials cooperate with one another, the transmission input shaft driving both a transmission element of the first differential and a transmission element of the second differential, the first electric drive motor driving a transmission element of the second differential, and the second electric drive motor being connected or connectable both to the first differential and to the third differential.

Preferably, in a first differential, a first transmission element is drive-connected to the transmission input shaft and can consequently be drive-connected to the internal combustion engine. A second transmission element is not directly driven by a first electric drive motor, but, instead, with a second differential being interposed. Furthermore, the third transmission element is drive-connected to the second electric drive motor. For example, the first transmission element is a ring gear, the second transmission element is a planet carrier and the third transmission element is a sun gear. Within the meaning of the invention, a connection or a drive may exist constantly or only temporarily, established by a shift element.

According to a particular embodiment of the hybrid transmission according to the invention, (at least) one shift element is present, via which the first differential and the second differential can be blocked each individually and with one another. This is, in particular, a coupling element which, in the activated state, connects in each case two of the six transmission elements of the first and the second differential to one another. With a coupling of this type, a particularly simple connection of the internal combustion engine to the first electric drive motor is possible; no rolling gearwheel connections, which may lead to losses of efficiency, need to be interposed in this case. Coupling means of this type may be utilized, on the one hand, for superposing the drive powers of the electric drive motor and of the internal combustion engine. On the other hand, the internal combustion engine can be driven by the electric drive motor in order to start the internal combustion engine. When the power of the internal combustion engine is not needed for driving the vehicle, furthermore, electric power generated by one or both electric drive motors, then operating as generators, can be fed back into a battery.

Preferably, the second differential is arranged axially between the first differential and the electric drive motors. For driving the third transmission element by the second electric drive motor, the torque flow needs to extend around the second differential. This may be accomplished by suitable webs or arms or by a closed bell-like element which, in addition to the drive connection, may serve further functions, for example to accommodate the differentials or of transmission elements, or to protect and/or mount certain component.

If a change between two adjacent continuous driving ranges takes place at a synchronous point, a synchronizing power of the actuated shift elements, which may lead to increased shift times and/or to increased wear, can be reduced or avoided. Depending on the desired operation of the motor vehicle, a change from a first continuous driving range into a discrete gear may also take place without a synchronization of the transmission elements effective in the particular gear.

Then, preferably, a switch over can be made selectively from the first continuous driving range into the gear or into the second continuous driving range. It is also conceivable that the discrete gear is activated only temporarily, with a subsequent change to the second continuous driving range.

According to a further refinement of the invention, at least four forward gears, two continuous driving ranges, a serial driving range and an electric driving range can be implemented by means of three differentials, two brakes and at least two clutches.

A further solution for achieving the object of the invention is provided by a motor vehicle including a hybrid transmission of the type described above which is integrated into a drive train having a standard drive configuration. The transverse cross-section of the drive train decreases along the longitudinal axis of the drive train with increasing distance from the internal combustion engine through the electric drive assemblies to the differentials, so that the drive train has a tapered configuration in this region. A drive train of this type can be integrated in a space-saving way into a vehicle tunnel tapering down between the electric drive assemblies and the differentials. It thereby also becomes possible, where appropriate, that the hybrid transmission can be moved further to the rear into the motor vehicle, so that construction compartment space is freed in the engine space by virtue of the configuration according to the invention.

Advantageous embodiments will become apparent from the description in connection with the drawings. Further features may be gathered from the drawing, in particular the illustrated geometries of the components, the relative dimensions of the various components, the relative arrangement of the components with respect to one another and their operative connections to one another. The combination of features, with design features illustrated in the figures and even in the embodiments of the prior art mentioned is likewise possible.

Preferred exemplary embodiments of the hybrid transmission according to the invention will be described below in greater detail with reference to the accompanying drawings:

DESCRIPTION OF PARTICULAR EMBODIMENTS

Figure 1:
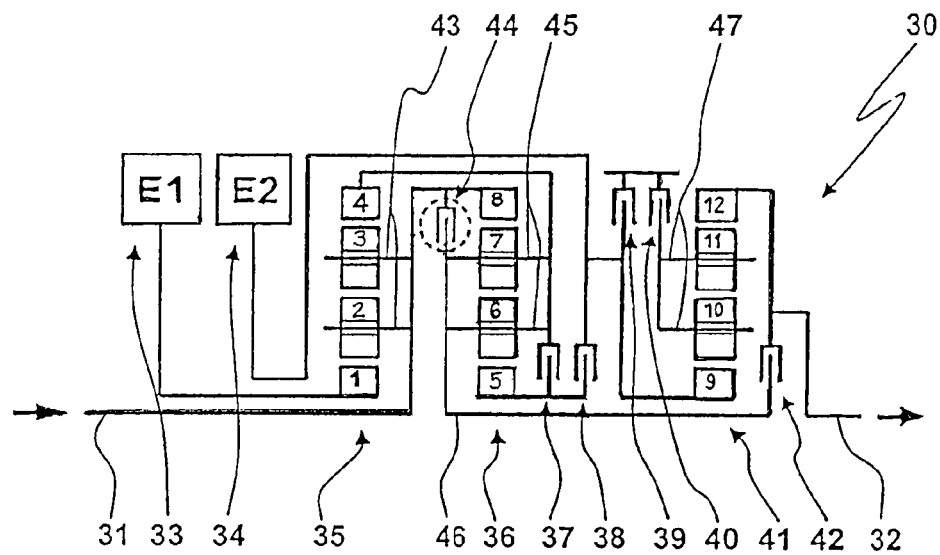
FIG. 1 shows a first exemplary embodiment of a hybrid transmission according to the invention in a diagrammatic gearwheel plan.

The hybrid transmission 30 is preferably used in a motor vehicle having a standard drive which is installed in the vehicle longitudinal direction and is integrated at least partially into a vehicle body tunnel.

The hybrid transmission 30 comprises an input shaft 31, which is drive-connected to an internal combustion engine, and an output shaft 32, which is drive-connected to wheels of the motor vehicle.

In the hybrid gearbox 30,
a first electric drive assembly 33,
a second electric drive assembly 34,
a second differential 35,
a first differential 36,
clutches 37, 38,
brakes 39, 40,
a third differential 41, and
a clutch 42
are disposed in the above order, in axially successive planes and essentially coaxially with respect to one another, between the transmission input shaft 31 and the transmission output shaft 32.

The transmission input shaft 31 extends concentrically through the second differential 35 and is fixedly drive-connected to a planet carrier 43 of the second differential 35, which is a double planet carrier in the exemplary embodiment according to FIG. 1 supporting two intermeshing planets 2, 3, and to a ring gear 8 of the first differential 36. For a first design variant, the clutch 44, indicated by the dashed circle in FIG. 1, is absent, so that no fixed connection between the ring wheel 8 and a double web 45 of the first differential 36 is present or can be established.

A sun gear 1 of the second differential 35 is driven directly by the first electric drive motor 33. The second electric drive motor 34 is connected in a drive structure extending radially on the outside, in the form of a web or a bell-like housing, around the second differential 35 and the first differential 36 and can be drive-connected to a sun gear 5 of the first differential 36 via the clutch 38. A ring gear 4 of the second differential 35 is constantly drive-connected to the double planet carrier 45, which supports two sets of planets 6, 7, via a drive connection extending radially on the outside around the clutch 44 and the first differential 36. Furthermore, the ring gear 4 can be drive-connected to the sun gear 5 via the clutch 37. The double planet carrier 45 is constantly drive-connected to an intermediate shaft 46 which extends concentrically through the first differential 36, clutches 37, 38, brakes 39, 40 and the third differential 41 and which can be drive-connected selectively to the transmission output shaft 32 via the clutch 42.

The ring gear 4 of the second differential 35, with clutches 37 and 38 closed, and the sun gear 5 of the first differential 36, with the clutch 38 closed, are connected to a sun gear 9 of the third differential 41 and can be connected to a housing part via the brake 39. A planet carrier 47 of the third differential 41, which planet carrier is designed as a double carrier for the exemplary embodiment according to FIG. 1 and supports two sets of planets 10, 11, can be connected to the housing via the brake 40. A ring gear 12 of the third differential 41 is connected constantly to the transmission output shaft 32 and can be connected to the concentric intermediate shaft 46 via the clutch 42. The clutch 37 may even be omitted, so that no connection between the double carrier 45 and the sun wheel 5 is possible at this point. In this case, a clutch 44 is provided, via which the ring gear 8 can be connected selectively to the double planet carrier 45.

Figure 2:
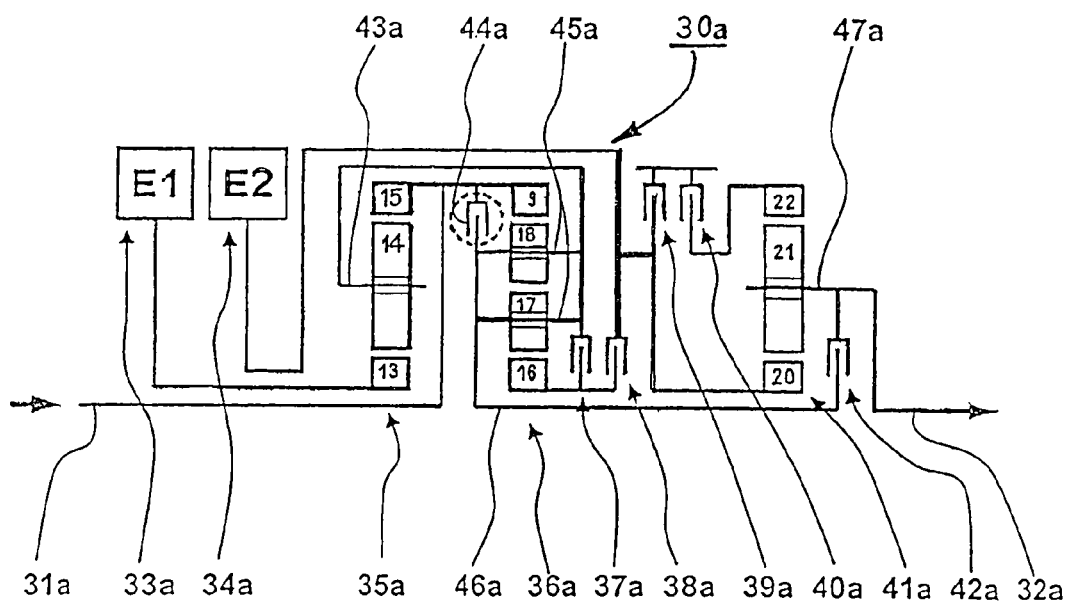
FIG. 2 shows a second exemplary embodiment of a hybrid transmission according to the invention in a diagrammatic gearwheel plan.

The variant, illustrated in FIG. 2, of a hybrid gearbox 30a differs from that of FIG. 1 in the set-up of the gear set structures, but not with regard to the loads of the electric motors and the clutches. In this case, the first differential 36a and the third differential 41a do not include double planet gears 2, 3 and 10, 11 but, instead, have single planet sets 14, 21, so that the planet carriers 43a and 47a are single planet carriers. In an embodiment which otherwise corresponds essentially to FIG. 1, the transmission input shaft 31a drives the ring gear 15 in the second differential 35a, while the planet carrier 43a of the second differential 35a is drive-connected to the double planet carrier 45a. In this case, the brake 40a is connected to a ring gear 22 of the third differential 41a, while the planet carrier 47a is connected fixedly to the transmission output shaft 32a.

The different operating modes of the hybrid transmissions 30, 30a will become apparent from the following table:

| Operating mode | Closed shift elements | | | | |
| --- | --- | --- | --- | --- | --- |
| | 40 | 42 | 39 | 37; 44 | (38) |
| 1st gear | X | | | X | X |
| 2nd gear | X | X | | | X |
| 3rd gear | | X | | X | X |
| 4th gear | | X | X | | X |
| 1st driving range | X | | | | X |
| 2nd driving range | | X | | | X |
| Serial | X | | | X | |
| Electric drive | X | | | | X |

The clutch 37 or 44 has the effect, in the closed state, that both, the second differential 35 and the first differential 36, rotate as a block. The variants of the clutch 37, 44 differ from one another, in the closed state, in the torque load on the clutch which occurs, while, in the open state, the differential rotational speeds are different.

When the brake 40 and the clutch 38 are closed, the hybrid transmission 30 operates in the continuous power-split driving range 1. By means of an appropriate control of the electric motors, proceeding from an infinite step-up at the starting point, the transmission can be adjusted in the direction of lower step-ups. In this case, the differential rotational speed of the (open) clutch 42 falls ever further. As soon as the differential rotational speed becomes zero, a synchronous point is reached, that is to say, a step-up at which, ideally, a change from the first driving range into a second continuous driving range takes place. In contrast to stepped gearboxes, in this case none of the transmission elements involved experiences a jump in rotational speed. The clutch 42 can then be closed, without the two clutch halves having to be synchronized actively. If only the clutch 42 is actuated, the hybrid transmission 30 changes into the second gear, the step-up of which always corresponds to the step-up at which the differential rotational speed of the clutch 42 is equal to zero.

By the clutch 40 subsequently being opened, a change to the second driving range is made. For the change from the driving range 1 to the driving range 2, a reverse order in the actuation of the shift elements is required. In this case, by the two shift elements 40, 42 being opened or closed in parallel, it can be shifted back and forth directly between the stepless driving ranges.

So that the internal combustion engine can be shut down when the vehicle is at a standstill or in overrun, a restarting of the internal combustion engine which is as reactionless as possible in terms of the output must be possible. By using the optional clutch 38, the transmission can be divided into two fully decoupled halves ("serial" mode). In this case, the first electric drive motor 33 is in each case connected fixedly in terms of rotation to the internal combustion engine, while the second electric drive motor 34 is drive-connected to the transmission output shaft 32. Thus, the internal combustion engine can be started by means of the first electric drive motor 34 either during standstill of the vehicle or while the vehicle is driven by the second electric drive motor using the first electric drive motor 33, wherein the starting the internal combustion engine has no influence on the transmission output torque.

In addition, in the "serial" mode, the first electric drive motor 33 can be operated, with the internal combustion engine running, as a generator which feeds the second electric drive motor 34, for example if the battery is empty, and thus ensures, for example, an extended electric reverse drive with sufficient power.

If the optional clutch 38 is omitted for reasons of cost or of construction space, the abovementioned serial mode is relinquished.

Then, insofar as no reverse gear with a fixed step-up is provided, reverse drive takes place as follows:

The brake 40 is closed and enables the second electric drive motor 34 to make available the output torque required for a desired driving maneuver. Since a further rotational speed, in particular a zero rotational speed, is predetermined by the internal combustion engine, which is advantageously at a standstill during the electric drive, all further rotational speeds are fixed. The first electric drive motor 33, therefore, either is drag-coupled at the given rotational speed or is energized to an extent such that the drag torque of the first electric drive motor 33 does not additionally have to be compensated for by the second electric drive motor 34.

If the battery is empty, reverse drive must take place in the power-compensated driving range 1. In this case, however, the output torques available are lower than during purely electric operation.

Slightly higher planet rotational speeds occur for the design variant, illustrated in FIG. 2, of the hybrid transmission 30a than for the hybrid transmission 30 illustrated in FIG. 1. Further modifications are possible between the structures illustrated according to FIG. 1 and FIG. 2. Thus, for example, the second differential 35 and the third differential 41 according to FIG. 1 may be replaced independently of one another by the respective solution according to FIG. 2.

It is noted that, although the electric drive motors are called motors they can be used as electric power generators when driven by the vehicle wheels in overrun situations or by the internal combustion engine, for example, when the batteries are exhausted.

What is claimed is:

1. A hybrid transmission for a hybrid motor vehicle, with at least two power-split driving ranges, and
at least two discrete gear steps, comprising:
a transmission input shaft (31), which is, or can be, drive-connected to an internal combustion engine, and a transmission output shaft (32),
a first electric drive motor (33) and a second electric drive motor (34), first, second and third differentials (36, 35, 41) disposed in the force flux between the transmission input shaft (31) and the transmission output shaft (32) and arranged in the transmission axially after the two electric drive motor (33, 34) which are disposed adjacent to one another, the second differential (35) being arranged axially between the first differential (36) and the two electric drive motors (35, 34), the transmission input shaft (31) being drive-connected both to a transmission element (ring gear 8; ring gear 9) of the first differential (36) and a transmission element (planet carrier 43; ring gear 15) of the second differential (35, 35a), the first electric drive motor (33) being drive-connected to a transmission element (sun wheel 1; sun wheel 13) of the second differential (35), and the second electric drive motor (34) being connected or connectable both to the first differential (36) and to the third differential (41).

2. The hybrid transmission as claimed in claim 1, wherein, in the first differential (36), a first transmission element (ring gear 8) is drive-connected to the transmission input shaft (31), a second transmission element (planet carrier 45) is drive-connected to the first electric drive motor (33), with the second differential (35) being interposed, and with a clutch (38) closed, a third transmission element (sun wheel 5) is drive-connected to the second electric drive motor (34).

3. The hybrid transmission as claimed in claim 1, wherein clutch elements (37; 44) are present, via which the first differential (36) and the second differential (35) can be blocked with respect to one another.

4. The hybrid transmission as claimed in claim 1, wherein at least one shift position of clutch elements (37, 38, 39, 40, 44) interposed into the force flux is provided, in which a) only one electric drive motor (second electric drive motor 34) is drive-connected to the transmission output shaft (32), and b) the transmission input shaft (31) and one electric drive motor (first electric drive motor 33) are ba) decoupled from the transmission output shaft (32) and bb) drive-connected to one another.

5. The hybrid. transmission as claimed in claim 1, wherein three differentials (35, 36, 41) are provided for establishing four forward gears, two continuous driving ranges, a serial driving range and an electric driving range.

6. The hybrid transmission as claimed in claim 5, wherein a change-over between the continuous driving ranges at a synchronous point is possible.

7. The hybrid gearbox as claimed in claim 5, wherein a change from a first continuous drive range into a gear takes place without a synchronization of the transmission elements (40, 42) effective in the particular gear.

8. The hybrid gearbox as claimed in claim 1 wherein two brakes (39, 40) and at least two clutches (37, 38, 42) are provided as shift elements.

\* \* \* \* \*